US008390665B2

(12) United States Patent
Ryu et al.

(10) Patent No.: US 8,390,665 B2
(45) Date of Patent: Mar. 5, 2013

(54) APPARATUS, SYSTEM AND METHOD FOR VIDEO CALL

(75) Inventors: Hee-seob Ryu, Suwon-si (KR); Seung-kwon Park, Yongin-si (KR); Chang-yong Kim, Seoul (KR); Jong-hyuk Jang, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 12/570,317

(22) Filed: Sep. 30, 2009

(65) Prior Publication Data

US 2011/0050840 A1 Mar. 3, 2011

(30) Foreign Application Priority Data

Sep. 3, 2009 (KR) .......................... 10-2009-0083177

(51) Int. Cl.
*H04N 7/14* (2006.01)
(52) U.S. Cl. ................. 348/14.01; 348/14.08; 348/14.12
(58) Field of Classification Search .... 348/14.01–14.16; 709/204–205; 370/260–261; 715/750, 755, 715/751

See application file for complete search history.

(56) References Cited

U.S. PATENT DOCUMENTS

| | | | | |
|---|---|---|---|---|
| 5,793,367 | A | * | 8/1998 | Taguchi ......................... 715/756 |
| 7,797,383 | B2 | * | 9/2010 | Baird ............................. 709/204 |
| 2008/0246833 | A1 | * | 10/2008 | Yasui et al. ................. 348/14.08 |
| 2008/0273078 | A1 | * | 11/2008 | Grasley et al. ............. 348/14.08 |
| 2010/0085415 | A1 | * | 4/2010 | Rahman ..................... 348/14.08 |
| 2010/0157016 | A1 | * | 6/2010 | Sylvain ...................... 348/14.08 |

FOREIGN PATENT DOCUMENTS

JP 9-149391 A 6/1997

\* cited by examiner

*Primary Examiner* — Melur Ramakrishnaiah
(74) *Attorney, Agent, or Firm* — Sughrue Mion, PLLC (57) ABSTRACT

Provided are an apparatus, system and method for facilitating a video call between a first caller and a second caller, the apparatus including: an image sensor which captures an image of the first caller; a display which displays an image of the second caller; a microphone which captures audio input by the first caller; a speaker which plays audio input by the second caller; a detector which is operable to determine a location of the first caller; and a controller which controls the detector to determine the location as corresponding to an original location, wherein if the first caller changes from the original location to a new location, the controller controls the detector to determine the location as being the new location and controls the microphone to readjust based on the determined new location of the first caller.

26 Claims, 9 Drawing Sheets

APPARATUS, SYSTEM AND METHOD FOR VIDEO CALL

CROSS-REFERENCE TO RELATED APPLICATION

This application claims priority from Korean Patent Application No. 10-2009-0083177, filed on Sep. 3, 2009 in the Korean Intellectual Property Office, the disclosure of which is incorporated herein by reference.

BACKGROUND OF THE INVENTION

1. Field of the Invention

Apparatuses, systems and methods consistent with the present invention relate to a video call, and more particularly, to a video call based on a location of a user.

2. Description of the Related Art

Video conferencing has become a popular method of communication between users. As used herein, the terms video conference and video conferencing are synonymous with a video call and video calling, respectively. Video conferencing includes both audio and video components. That is, a video call between parties provides for audio and video communications between users. In terms of hardware, a user simply needs a display device, a speaker (or speakers), an image sensor and a microphone (or microphones), in order to simultaneously conduct a video call with one or more parties. The display device itself can be any type of display, including but not limited to a television (TV), a computer monitor, etc. Further note that the image sensor may include more than one image sensing device.

In order to facilitate such a video call, the display device is used to show one or more parties to the call. For example, in a video conference between two people, the image of each party is captured by their respective image sensors, and the display device on each party's side shows an image of the other party, or alternatively, shows images for both the caller and the called party. Similarly, each party to the call speaks into their respective microphones, whereupon the respective speakers play the conversation so that each party can hear the audio portion of the call.

However, a problem exists if any party to a video call moves from an original location to another location. For example, a party to a call may move away from the location where the image sensor, microphone and speakers are positioned. In such a case, the capturing and playing of the video and the audio becomes problematic. Consequently, there is a need for an improved way of facilitating a video call.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

As used herein, the term "image" may include a still image or a video stream. The image may also be a broadcast image, or an image retrieved from a storage device. The term "display" (i.e., the noun) or "display device" includes a television TV, a computer monitor, etc. Additionally, the terms "party," "user," "person" and "caller" are used interchangeably herein; similarly, the terms "location" and "position" are also used interchangeably herein. In some instances, the above-noted interchangeable terms may be used in a distinguishing manner for the sake of clarity.

An exemplary embodiment of the present invention provides a video call apparatus for facilitating a video call between a first caller and a second caller, the apparatus including: an image sensor which captures an image of the first caller; a display which displays an image of the second caller; a microphone which captures audio input by the first caller; a speaker which plays audio input by the second caller; a detector which is operable to determine a location of the first caller; and a controller which controls the detector to determine the location as corresponding to an original location, wherein if the first caller changes from the original location to a new location, the controller controls the detector to determine the location as being the new location and controls the microphone to readjust based on the determined new location of the first caller.

According to an exemplary embodiment of the present invention, if the location is determined as being the new location, the controller may further control the image sensor to readjust based on the determined new location of the first caller.

According to an exemplary embodiment of the present invention, if the location is determined as being the new location, the controller may further control the speaker to readjust based on the determined new location of the first caller.

According to an exemplary embodiment of the present invention, the controller may control the display to display the image of the second caller in a window, and if the first caller changes from the original location to the new location, the controller may control the display to move the window to a different position on the display corresponding to the determined new location.

According to an exemplary embodiment of the present invention, the display may further display an image of the first caller.

According to an exemplary embodiment of the present invention, the controller may control the display to display the image of the first caller in a first window at a first position on the display, and the image of the second caller in a second window at a second position on the display, and if the first caller changes from the original location to the new location, the controller may control the display to move the first window from the first position to a new first position according to the determined new location of the first caller, and may control the display to move the second window from the second position to a new second position according to the determined new location of the first caller.

According to an exemplary embodiment of the present invention, the detector may determine the location of the first caller by using at least one of the image sensor and the microphone to determine the location of the first caller.

According to an exemplary embodiment of the present invention, the image sensor may readjust based on the determined new location by changing at least one of a pan angle, tilt angle and a zoom value of the image sensor to correspond to the detected change in location of the first caller.

According to an exemplary embodiment of the present invention, the microphone may readjust based on the determined new location by changing a directionality of the microphone.

According to an exemplary embodiment of the present invention, the speaker may readjust based on the determined new location by changing a directionality of the speaker.

According to an exemplary embodiment of the present invention, if the display displays a secondary image in a background window, the controller may control the display to display the image of the second caller in a foreground window, and if the first caller changes from the original location to the new location, the controller may control the display to move the window to a different position on the display corresponding to the determined new location without interrupting the displaying of the secondary image in the background window. In keeping with definition of the term "image" as noted above, the secondary image may be a plurality of images (e.g., a video) or a still, or single image. Further, the secondary image(s) may be received via a broadcast signal or retrieved from a storage device.

An exemplary embodiment of the present invention provides a video call system for facilitating a conference video call between a plurality of callers at a first location and at least one caller at a second location, the system including: an image sensor which captures an image of a first party from among the plurality of callers at the first location; a display which displays an image of the at least one caller at the second location; a microphone which captures audio from the first speaking party at the first location; a speaker which plays audio from the at least one caller at the second location; a detector which is operable to determine a position of a party currently speaking at the first location; and a controller, wherein if a first party, from among the plurality of callers at the first location, begins speaking, the controller controls the detector to determine the position of the party currently speaking as being a position of the first party, and if a second party, from among the plurality of callers at the first location, begins speaking, the controller controls the detector to determine the position of the party currently speaking as being a position of the second party and controls the microphone to readjust based on the determined position of the party currently speaking.

An exemplary embodiment of the present invention provides a method of facilitating a video call between a first caller and a second caller, the method including: capturing an image of the first caller; displaying an image of the second caller; capturing audio input by the first caller; playing audio input by the second caller; determining a location of the first caller with respect to a predetermined position; and if the first caller changes to a new location, controlling the microphone to readjust based on the determined new location of the first caller.

According to an exemplary embodiment of the present invention, if the first caller changes to a new location, the method may further include controlling the image sensor to readjust based on the determined new location of the first caller.

According to an exemplary embodiment of the present invention, if the first caller changes to a new location, the method may further include controlling the speaker to readjust based on the determined new location of the first caller.

According to an exemplary embodiment of the present invention, the method may further include displaying the image of the second caller in a window, and if the first caller changes from the original location to the new location, moving the window to a different position on the display corresponding to the determined new location.

According to an exemplary embodiment of the present invention, the method may further include displaying an image of the first caller.

According to an exemplary embodiment of the present invention, the method may further include displaying the image of the first caller in a first window at a first position on the display, and the image of the second caller in a second window at a second position on the display, and if the first caller changes from the original location to the new location, the method may further include moving the first window from the first position to a new first position according to the determined new location of the first caller, and moving the second window from the second position to a new second position according to the determined new location of the first caller.

According to an exemplary embodiment of the present invention, the determining of the location of the first caller may be performed by using at least one of the image sensor and the microphone.

According to an exemplary embodiment of the present invention, the controlling of the image sensor to readjust based on the determined new location may be performed by changing at least one of a pan angle, tilt angle and a zoom value of the image sensor to correspond to the new location of the first caller.

According to an exemplary embodiment of the present invention, the controlling of the microphone to readjust based on the determined new location may be performed by changing a directionality of the microphone.

According to an exemplary embodiment of the present invention, the controlling of the speaker to readjust based on the determined new location may be performed by changing a directionality of the speaker.

According to an exemplary embodiment of the present invention, the method may further include displaying a secondary image in a background window; displaying the image of the second caller in a foreground window; and if the first caller changes from the original location to the new location, moving the window to a different position on the display corresponding to the determined new location without interrupting the displaying of the secondary image in the background window.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Hereinafter, exemplary embodiments of the present invention will be described with reference to accompanying drawings, wherein like numerals refer to like elements and repetitive descriptions will be avoided as necessary.

Figure 1:
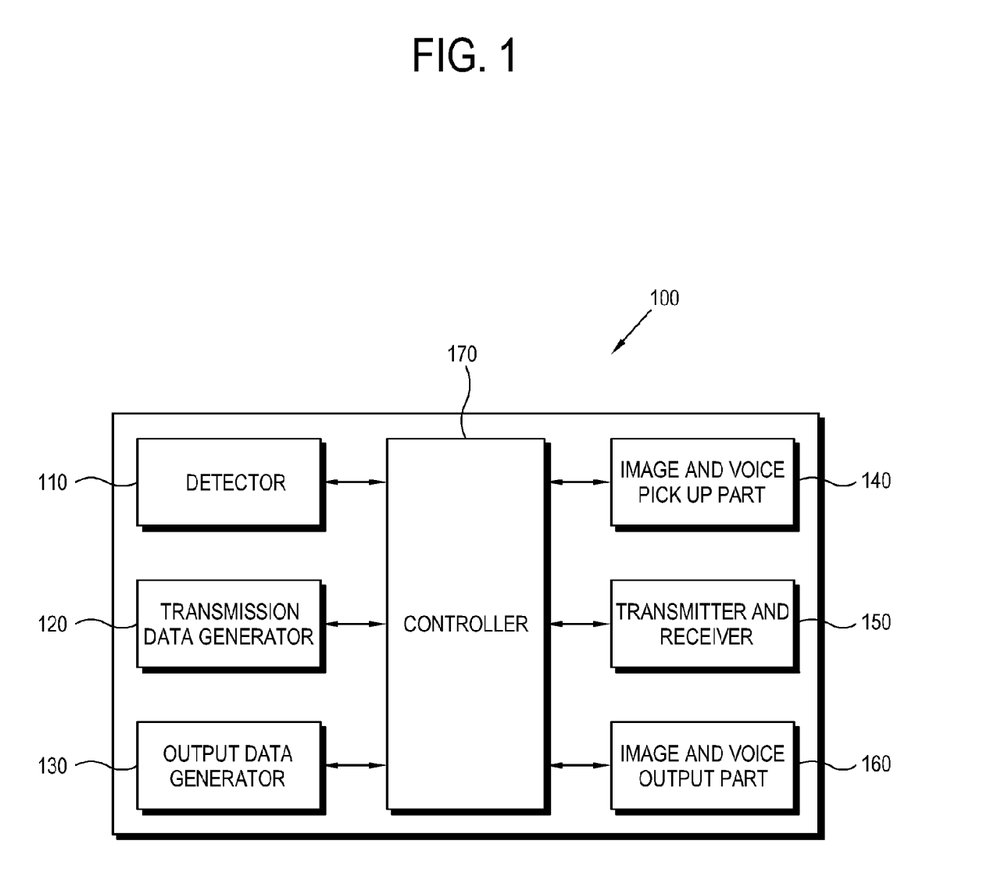
FIG. 1 illustrates an example of a video call apparatus according to an exemplary embodiment of the present invention.

A video calling apparatus according to an exemplary embodiment of the present invention is shown in FIG. 1. The apparatus 100 includes a detector 110 which detects a location of a user with respect to a predetermined point. The predetermined point may be a point on a display apparatus, for example, or any other point that may be used as a reference point. The apparatus further includes a transmission data generator 120 for generating encoded packets to transfer to another caller, an output data generator 130 for decoding packets received from another caller, an image and voice pickup part 140 for capturing an image and a voice signal from a caller using the apparatus, a transmitter and receiver 150 for transmitting to and receiving from another caller, an image and voice output part 160 for outputting image and voice signals, and a controller 170 for controlling the overall operation of the apparatus.

According to an exemplary embodiment of the present invention, the transmitter and receiver 150 for transmitting to and receiving from another caller may utilize any network connection between at least two parties to a video call. The network can be any type whereby a connection between parties may occur, such as over a local area network or over the internet. Also, while many of the examples discussed herein describe a call between two parties, the number of parties between which a video call can take place is not limited to two under the present invention. On the contrary, one of skill in the art would recognize that the exemplary embodiments described herein may equally apply to video calls involving a plurality of callers.

Figure 2:
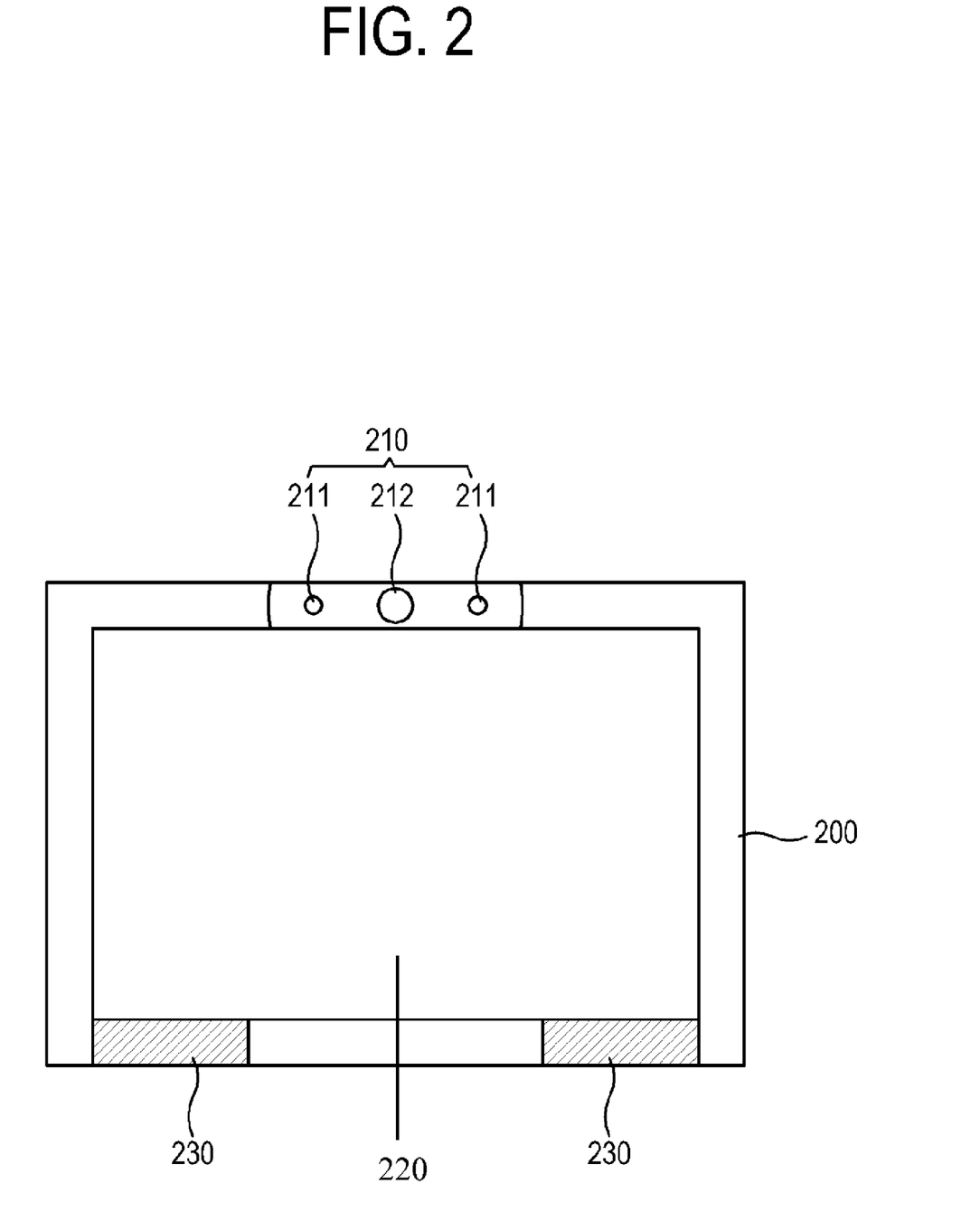
FIG. 2 illustrates another example of a video call apparatus according to an exemplary embodiment of the present invention.

The image and voice pickup part may include a camera and a microphone, for example which respectively capture an image and a voice signal from a caller using the apparatus. For example, FIG. 2 shows an example of a video call apparatus 200 including an image and voice pickup part 210, a display 220 and speakers 230. The image and voice pickup part 210 may include an image sensor 211 and microphones 212.

The image sensor 211 may be any type of device capable of receiving an image of the caller. For example, the image sensor 211 may be a traditional camera such as a charge-coupled device (CCD) camera, a complementary metal—oxide—semiconductor (CMOS) active-pixel sensor (APS) camera, etc. Alternatively, the image sensor may be a non-traditional type of camera such as a thermographic camera (e.g., Forward Looking InfraRed (FLIR)), etc. However, the present invention is not limited to these types of image sensors, and as noted above, may employ any device capable of receiving an image of the caller. Further, the image sensor 211 may include more than one image sensing device. For example, the image sensor 211 may be a stereo camera, or be two or more separate cameras, etc.

The microphone 212 may be any type of microphone which is capable of receiving a voice input signal from a caller. For example, a directional microphone array may be used to pinpoint a location of a caller based on a voice input signal. However, the present invention is not limited to just this type of microphone, and as noted above, may employ any device capable of receiving a voice input signal from a caller.

It should also be noted that while some exemplary embodiments of the present invention may utilize both an image sensor and a microphone for locating a position of a caller using both imaging and sound, other exemplary embodiments of the present invention include locating a position of a caller using either imaging or sound. That is, the position locating operation as described herein may either be performed by the image sensor, the microphone, or both. Thus, the above-noted image sensor may or may not be employed to locate a position of a caller. Likewise, the above-noted microphone may or may not be capable of locating a position of a caller based on sound.

Figure 3:
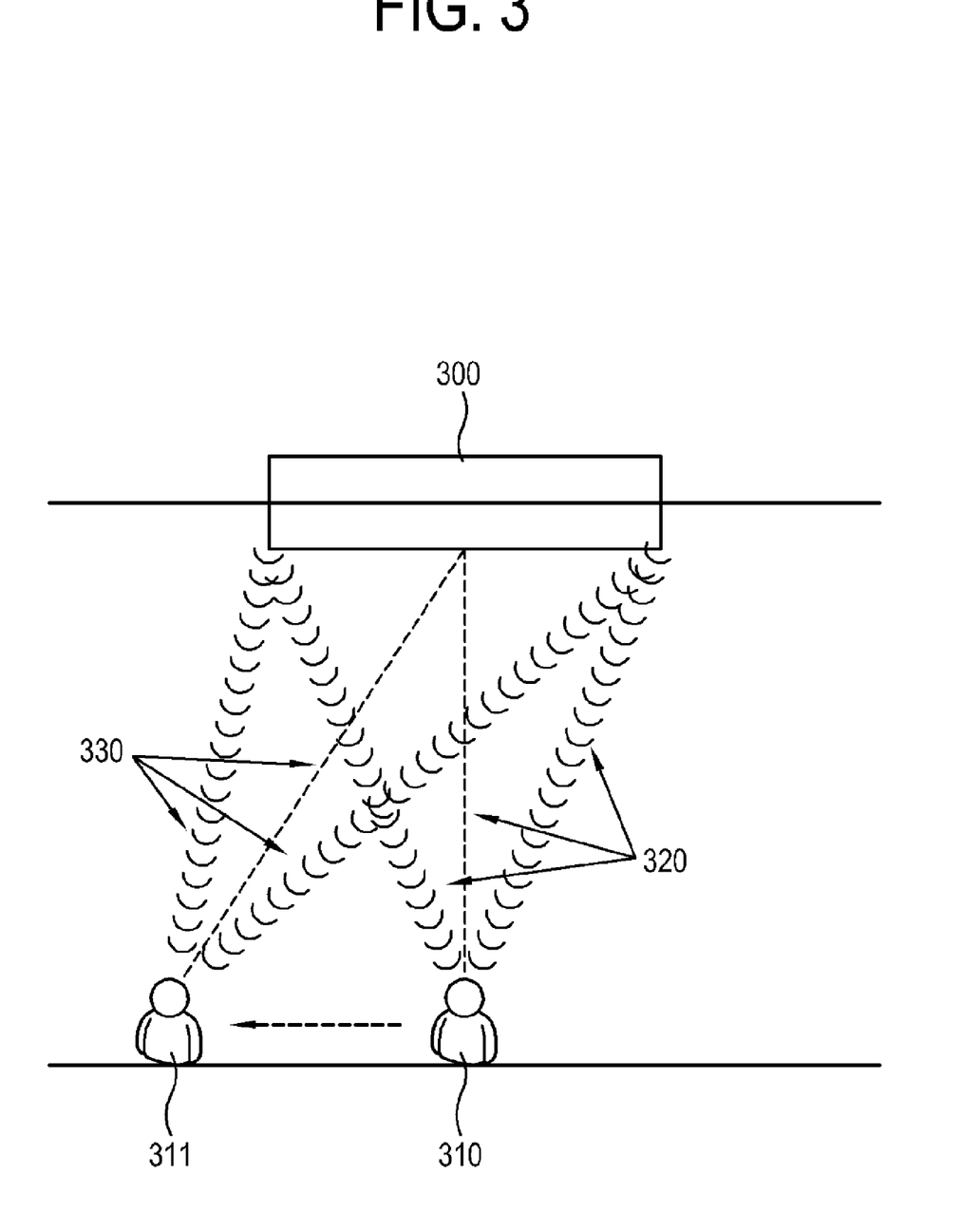
FIG. 3 illustrates an example of an operation of a video call apparatus according to an exemplary embodiment of the present invention.

FIG. 3 illustrates an operation of a video call apparatus according to an exemplary embodiment of the present invention. A user is first located at an original position 310 in the center of the video call apparatus 300. The image sensor and microphone reception focus areas as well as the speaker output signals (collectively shown as "320") are focused on the caller's position with respect to the center of the video call apparatus 300. If the caller changes her position to a new position 311, the video call apparatus 300 can readjust the image sensor and microphone reception focus areas as well as the speaker output signals so (collectively shown as "330") so as to focus on the caller's new position 311 with respect to the center of the video call apparatus 300. Accordingly, a caller may move her location to a new position and still maintain an optimal video call connection with another caller.

The readjustment of the image sensor based on the determined new location may be accomplished by changing at least one of a pan angle, tilt angle and a zoom value of the image sensor to correspond to the detected change in location of the first caller. The readjustment of the microphone and the speaker(s) based on the determined new location may be accomplished by changing a directionality of the microphone and the speaker(s), respectively. One of skill in the art would recognize that the change in directionality of the microphone and/or speaker(s) could be accomplished via hardware and/or software.

Additionally, it should be noted that while some exemplary embodiments of the present invention describe the image sensor, the microphone and the speakers as collectively readjusting based on a caller's determined new position, the present invention does not require that all three components of the video call apparatus readjust. For example, another exemplary embodiment may only readjust the microphone, or only the speakers, etc. Likewise, yet another exemplary embodiment may only readjust some combination of the components, such as the microphone and the speakers, or the microphone and image sensor, etc. One of skill in the art would recognize that different embodiments and combinations are possible within the scope of the present invention.

Figure 4A:
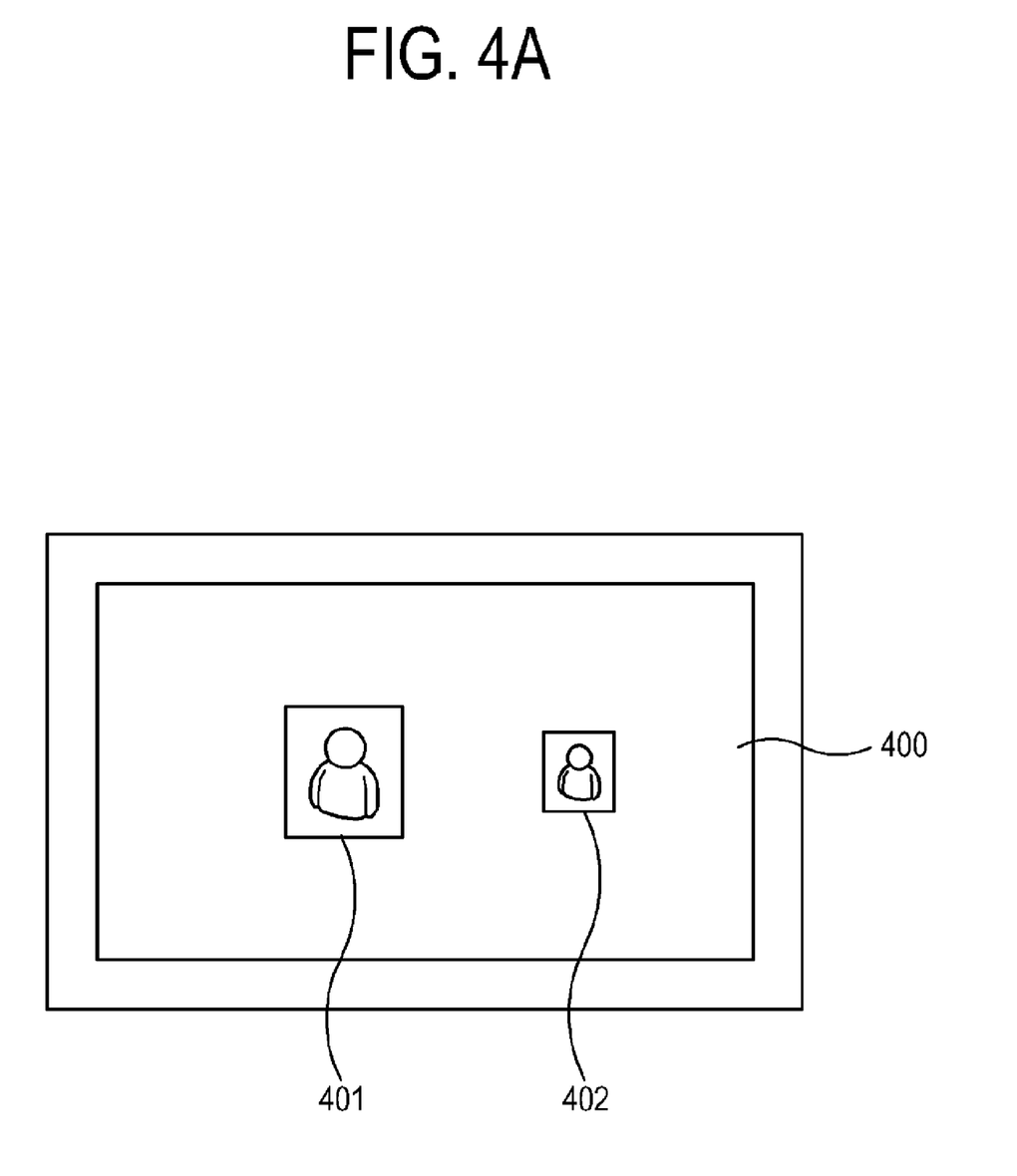
FIG. 4A illustrates an example of an operation of a video call apparatus according to an exemplary embodiment of the present invention.

According to an exemplary embodiment of the present invention, the display of the video call apparatus may display one or both of the parties to a video call. FIG. 4A shows an example of an operation of the video call apparatus according to an exemplary embodiment of the present invention whereby windows displaying both the called party 401 and the caller 402 are displayed on the display 400. However, one of skill in the art would recognize that it is not necessary to display windows for all parties to a call. For example, the display might simply display the called party, or the calling party.

Figure 4B:
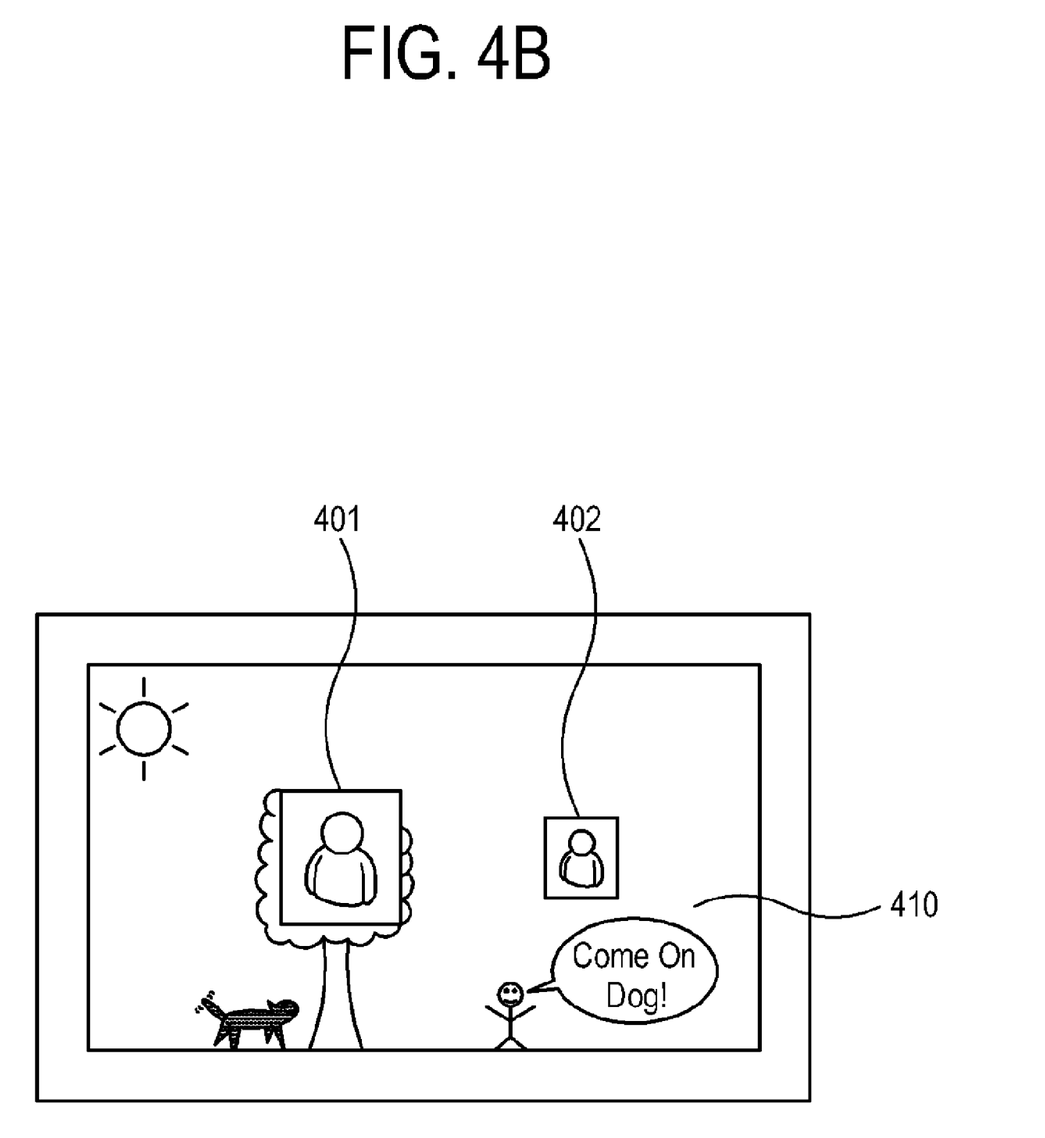
FIG. 4B illustrates an example of an operation of a video call apparatus according to an exemplary embodiment of the present invention.

FIG. 4B shows another exemplary embodiment of the present invention, whereby an image of a selected program 410 is displayed in the background while windows displaying both the called party 401 and the caller 402 are displayed in the foreground on the display 400. In this exemplary embodiment, the selected program 410 (i.e., the background program) runs uninterrupted by the operation of the video call and the displaying of the windows for both the called party 401 and the caller 402. Again, the present invention is not limited to this example, and one of skill in the art would understand that the displaying of the foreground windows and background program could be organized in various ways, both spatially and temporally.

As mentioned previously, the displayed "image" of the previously selected program 410 in FIG. 4B may include a still image or a collection of images such as in a broadcast video signal, for example. Of course, one of skill in the art would recognize that the windows displaying both the called party 401 and the caller 402 may be displayed in locations other than those depicted in FIG. 4B. Additionally, as noted above with FIG. 4A, it is not necessary to display windows for all of the parties to a call.

Figure 5A:
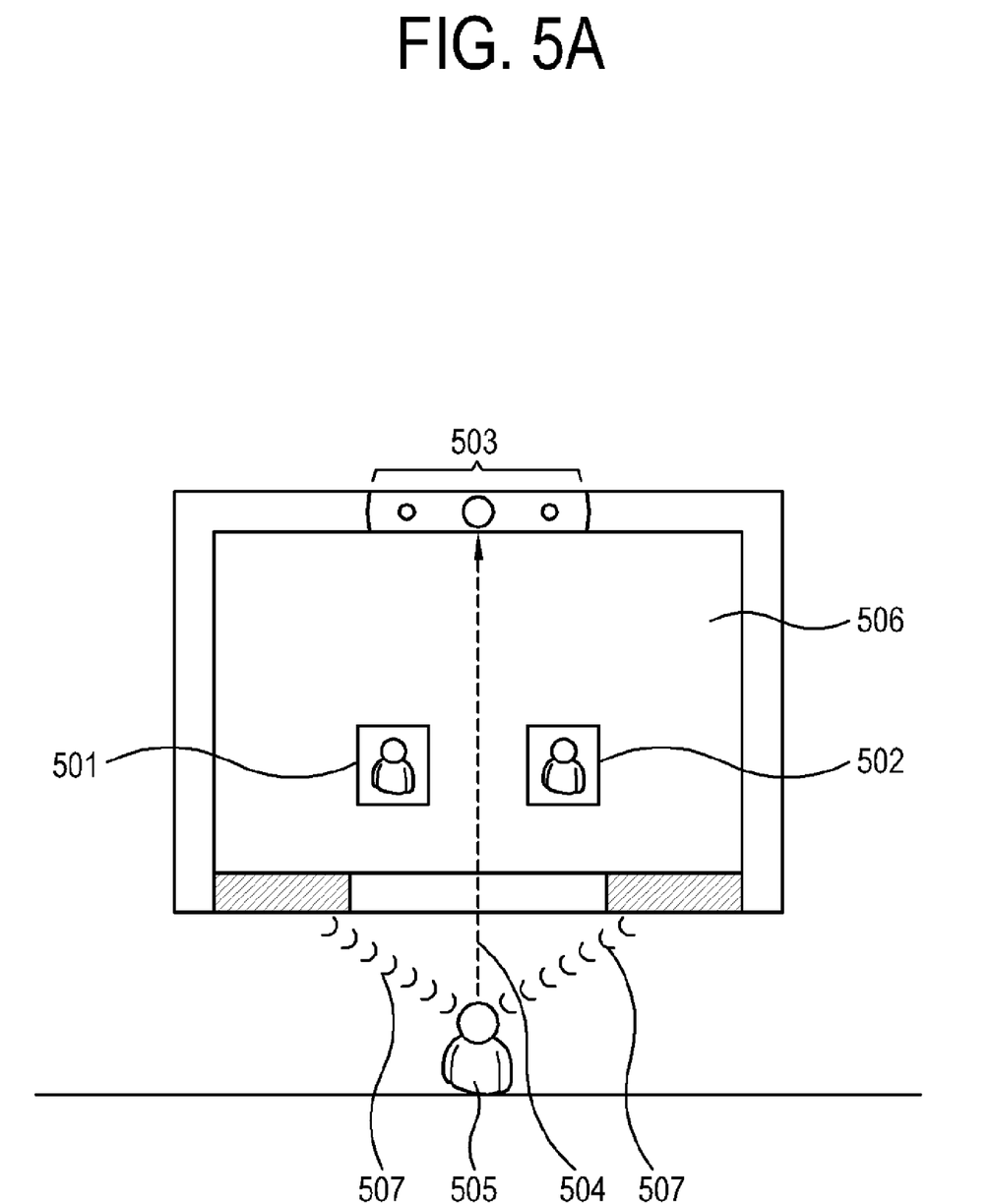
FIG. 5A illustrates an example of an operation of a video call apparatus according to an exemplary embodiment of the present invention.

FIG. 5A illustrates an example of an operation of a video call apparatus according to an exemplary embodiment of the present invention. If a caller 505 sits in a location corresponding, for example, to a center point with respect to an image and voice pickup part 503, windows displaying both the called party 501 and the caller 502 may be displayed in locations which are optimal for the position of the caller 505, e.g., about a central axis of the display 506. As noted above, the image sensor and microphone reception focus areas 504, as well as the directionality of the speaker output signals 507 are optimally directed for the position of the caller 505.

Figure 5B:
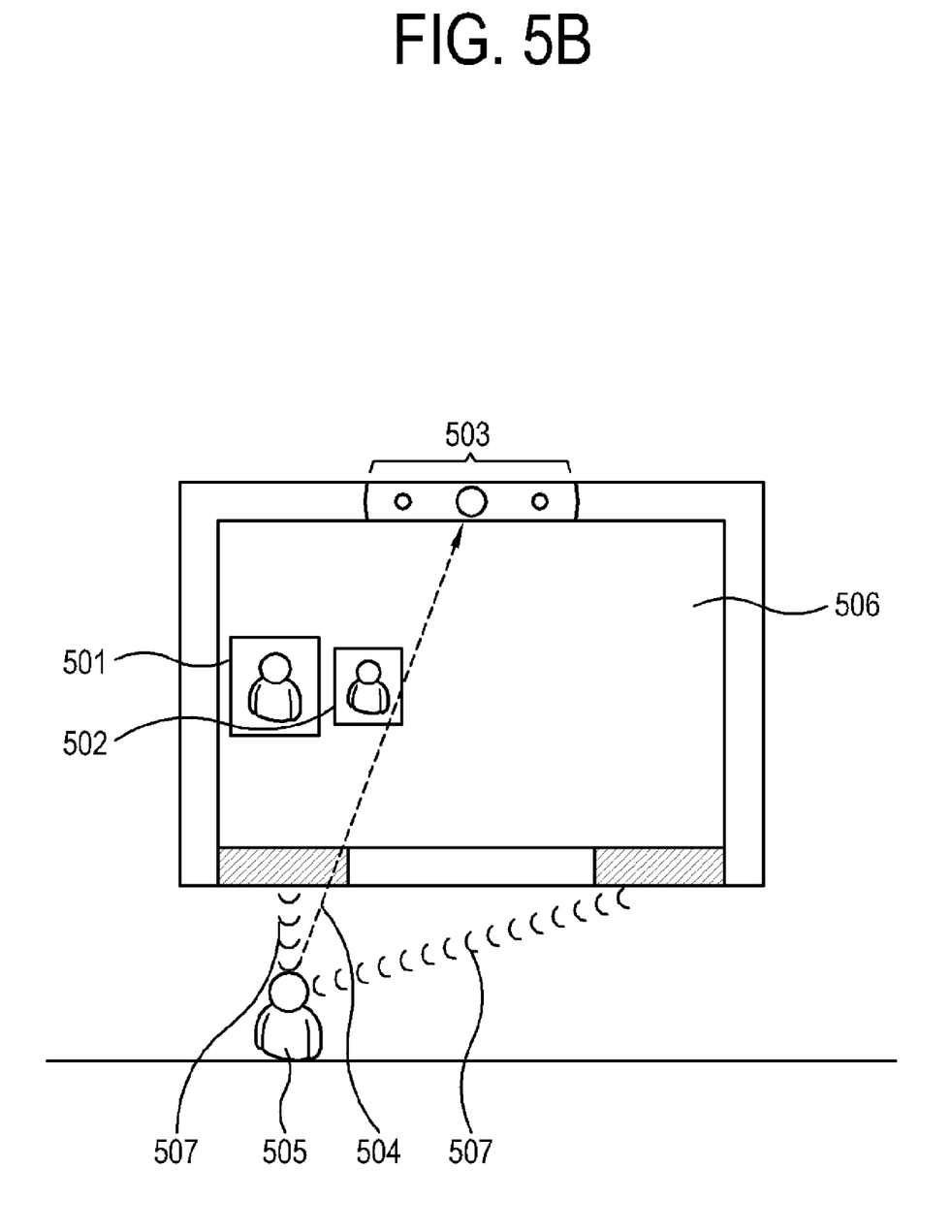
FIG. 5B illustrates an example of an operation of a video call apparatus according to an exemplary embodiment of the present invention.

However, as shown in FIG. 5B, if the user moves to a new location, the windows displaying both the called party 501 and the caller 502 may likewise be shifted to one side of the display 506 so as to maintain an optimal placing based on the new location of the caller 505. Of course, the determination of which location is "optimal" may depend on the preference of the user, the size of the screen, etc. For example, a user may prefer to have the windows displaying both the called party 501 and the caller 502 shift in a direction opposite to the direction of the change in location of the caller 505 (e.g., the caller 505 moves left but the windows 501, 502 move right).

Alternatively, the windows displaying both the called party 501 and the caller 502 might be made to move in different directions. For example, if the caller 505 moves to the left, the caller 505 might choose to move the window displaying herself 502 to the right, while choosing the window displaying the called party 501 to the left. Thus, according to an exemplary embodiment of the present invention, the organization and displaying of the call windows 501, 502 may be set based on a user's preference.

Figure 6:
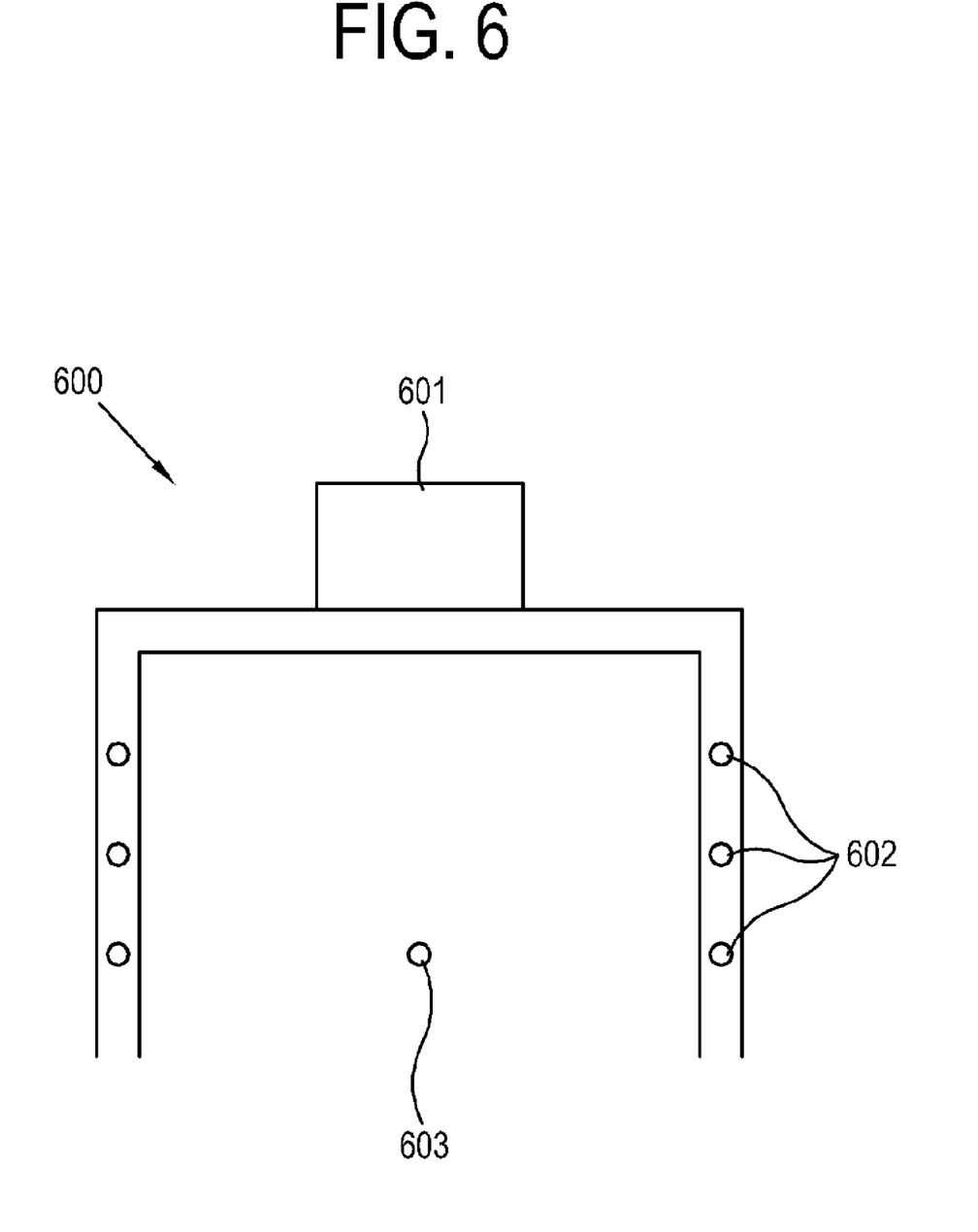
FIG. 6 illustrates an example of an operation of a video call apparatus according to an exemplary embodiment of the present invention.

The exemplary embodiments above describe a video call between a caller and a called party. However, another exemplary embodiment of the present invention includes an apparatus which is suited for a conference room setting. For example, FIG. 6 shows a conference room-type system 600 having a display 601, a distributed plurality of microphones 602, and a centrally located image sensor 603. Speakers (not shown) may be located at the display 601, or elsewhere. In this setting, if a person begins to speak into his microphone, the system can determine which microphone is being used, and based on that determination, designate the active speaker as the location of the caller. Afterwards, if a different person speaks into a different microphone, the system can determine the location of the different person speaking as being the "new location" of the caller, and then readjust the equipment so as to focus on the new location. As noted above, at least one of the image sensor 603, microphones 602 and speakers can be made to readjust based on the determined location of the caller.

In the example illustrated in FIG. 6, the location of the caller does not change, but rather the identity of the caller changes. Thus, the system must determine which speaker is currently speaking and then readjust at least one of the image sensor(s), microphone(s) and speaker(s) based on the location of the person currently speaking. As noted above, the image sensor 603 may include more than one image sensing device. The location of the person currently speaking may be determined, for example, based on an audio signal received by the microphone(s), and/or images received by the image sensor.

Figure 7:
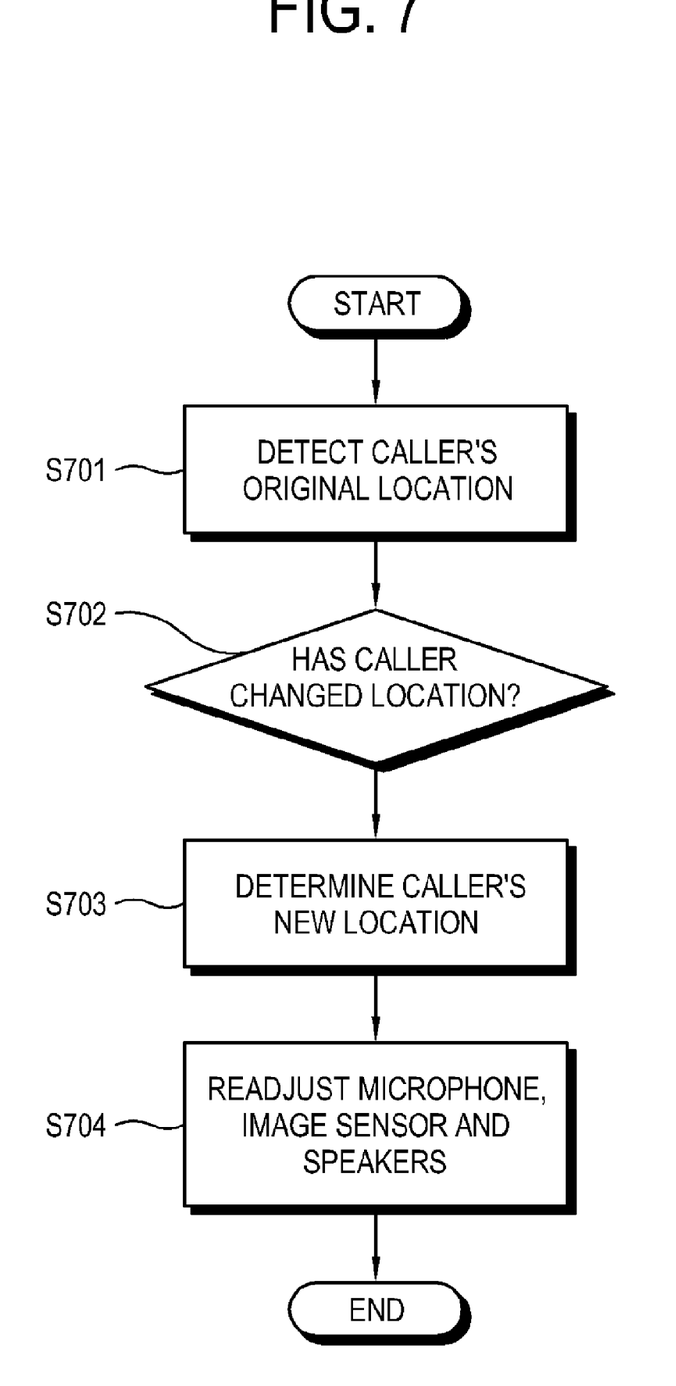
FIG. 7 illustrates an example of a method of operating a video call apparatus according to an exemplary embodiment of the present invention.

FIG. 7 illustrates an example of a method of operating a video call apparatus according to an exemplary embodiment of the present invention. Initially, a caller's original location is determined in operation 5701. Then, if a caller's location is determined to have changed in operation 5702, the caller's new location is determined in operation 5703. Once the new location is determined, at least one of the image sensor, microphone(s) and speaker(s) can be readjusted in operation 5704 so as to focus on the determined new location.

The foregoing exemplary embodiments are merely exemplary and are not to be construed as limiting the present invention. The present teaching can be readily applied to other types of methods and apparatuses. Also, the description of the exemplary embodiments of the present invention is intended to be illustrative, and not to limit the scope of the claims, and many alternatives, modifications, and variations will be apparent to those skilled in the art.

What is claimed is:

1. A video call apparatus for facilitating a video call between a first caller and a second caller, the video call apparatus comprising:
   an image sensor which captures an image of the first caller;
   a display which displays an image of the second caller;
   a microphone which captures audio input by the first caller;
   a speaker which plays audio input by the second caller;
   a detector which is operable to determine a location of the first caller; and
   a controller which controls a direction of the microphone to adjust based on the location of the first caller determined by the detector.

2. The video call apparatus of claim 1, wherein the controller further controls the image sensor to adjust based on the location of the first caller determined by the detector.

3. The video call apparatus of claim 2, wherein the image sensor adjusts based on a determined new location by changing at least one of a pan angle, a tilt angle and a zoom value of the image sensor to correspond to a change in location of the first caller.

4. The video call apparatus of claim 1, wherein the controller further controls the speaker to adjust based on the location of the first caller determined by the detector.

5. The video call apparatus of claim 4, wherein the speaker adjusts based on a determined new location of the first caller by changing a directionality of the speaker.

6. The video call apparatus of claim 1, wherein the controller controls the display to display the image of the second caller in a window, and a position of the window is determined based on the location of the first caller determined by the detector.

7. The video call apparatus of claim 1, wherein the display further displays an image of the first caller.

8. The video call apparatus of claim 7, wherein the controller controls the display to display the image of the first caller in a first window at a first position on the display, and to display the image of the second caller in a second window at a second position on the display, and if the first caller changes from an original location to a new location, the controller controls the display to move the first window from the first position to a new first position according to the new location of the first caller, and controls the display to move the second window from the second position to a new second position according to the new location of the first caller.

9. The video call apparatus of claim 1, wherein the detector determines the location of the first caller by using the image sensor to determine the location of the first caller.

10. The video call apparatus of claim 1, wherein if the display displays a secondary image in a background window, the controller controls the display to display the image of the second caller in a foreground window, and if the first caller changes from an original location to a new location, the controller controls the display to move the foreground window to a different position on the display corresponding to a determined new location of the first caller without interrupting the displaying of the secondary image in the background window.

11. A video call system for facilitating a conference video call between a plurality of callers at a first location and at least one caller at a second location, the system comprising:
an image sensor which captures an image of a first party from among the plurality of callers at the first location;
a display which displays an image of the at least one caller at the second location;
a microphone which captures audio from the first party at the first location;
a speaker which plays audio from the at least one caller at the second location;
a detector which is operable to determine a position of a party currently speaking at the first location; and
a controller which controls a direction of the microphone to adjust based on the determined position of the party currently speaking.

12. The video call system of claim 11, wherein the controller further controls the image sensor to adjust based on the determined position of the party currently speaking.

13. The video call system of claim 11, wherein the controller further controls the speaker to adjust based on the determined position of the party currently speaking.

14. A method of facilitating a video call between a first caller and a second caller, the method comprising:
capturing an image of the first caller;
displaying an image of the second caller;
capturing audio input by the first caller;
playing audio input by the second caller;
determining a location of the first caller with respect to a predetermined position; and
controlling a direction of the microphone to adjust based on the determined location of the first caller.

15. The method of claim 14, wherein the method further comprises controlling an image sensor to adjust based on the determined location of the first caller.

16. The method of claim 15, wherein the controlling of the image sensor to adjust based on the determined location is performed by changing at least one of a pan angle, a tilt angle and a zoom value of the image sensor to correspond to a new location of the first caller.

17. The method of claim 14, wherein the method further comprises controlling a speaker to adjust based on the determined location of the first caller.

18. The method of claim 17, wherein the controlling of the speaker to adjust based on the determined location of the first caller is performed by changing a directionality of the speaker.

19. The method of claim 14, further comprising displaying the image of the second caller in a window, wherein a position of the window is determined based on the determined location of the first caller.

20. The method of claim 14, further comprising displaying an image of the first caller.

21. The method of claim 20, further comprising displaying the image of the first caller in a first window at a first position on a display, and displaying the image of the second caller in a second window at a second position on the display, and if the first caller changes from an original location to a new location, the method further comprises moving the first window from the first position to a new first position according to the determined location of the first caller, and moving the second window from the second position to a new second position according to the determined location of the first caller.

22. The method of claim 14, wherein the determining of the location of the first caller is performed by using at least one of an image sensor and the microphone.

23. The method of claim 14, further comprising:
displaying a secondary image in a background window;
displaying the image of the second caller in a foreground window; and
if the first caller changes from an original location to a new location, moving the foreground window to a different position on a display, the different position corresponding to the determined location of the first caller, without interrupting the displaying of the secondary image in the background window.

24. A video call apparatus for facilitating a video call between a first caller and a second caller, the video call apparatus comprising:
an image sensor which captures an image of the first caller;
a display which displays an image of the second caller;
a detector which is operable to determine a location of the first caller; and
a controller which controls the display to display the image of the second caller in a window and controls the detector to determine the location as corresponding to an original location, wherein if the first caller changes from the original location to a new location, the controller controls the detector to determine the location as being the new location, and if the first caller changes from the original location to the new location, the controller controls the display to move the window to a different position on the display corresponding to the determined new location of the first caller.

25. The video call apparatus of claim 24, wherein the display further displays an image of the first caller.

26. The video call apparatus of claim 25, wherein the controller controls the display to display the image of the first caller in a first window at a first position on the display, and to display the image of the second caller in a second window at a second position on the display, and if the first caller changes from the original location to the new location, the controller controls the display to move the first window from the first position to a new first position according to the determined new location of the first caller, and controls the display to move the second window from the second position to a new second position according to the determined new location of the first caller.

* * * * *